United States Patent
Cis et al.

(10) Patent No.: US 10,955,020 B2
(45) Date of Patent: Mar. 23, 2021

(54) METHOD FOR MANUFACTURING A TORSION SPRING FOR USE IN A SERVOVALVE AND THE TORSION SPRING ITSELF

(71) Applicant: Hamilton Sundstrand Corporation, Charlotte, NC (US)

(72) Inventors: Marcin Cis, Lutynia (PL); Piotr Sawicki, Bogdaniec (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 189 days.

(21) Appl. No.: 16/030,944

(22) Filed: Jul. 10, 2018

(65) Prior Publication Data

US 2019/0093725 A1    Mar. 28, 2019

(30) Foreign Application Priority Data

Sep. 22, 2017  (EP) .................................... 17461610

(51) Int. Cl.
*F15B 13/043* (2006.01)
*F16F 1/16* (2006.01)

(52) U.S. Cl.
CPC ............ *F16F 1/16* (2013.01); *F15B 13/0438* (2013.01); *F16F 2226/04* (2013.01)

(58) Field of Classification Search
CPC ........... F16F 1/16; F16F 2226/04; H01F 7/08; H01F 7/088; F51B 13/0438; F51B 5/003; F15B 13/0438; F15B 5/003
See application file for complete search history.

(56) References Cited

U.S. PATENT DOCUMENTS

| 3,498,308 | A | 3/1970 | Miller et al. |
| 3,556,150 | A * | 1/1971 | King ....................... F15B 5/003 137/625.4 |
| 10,069,353 | B2 * | 9/2018 | de la Chevasnerie ....................... F15B 13/0436 |
| 10,458,440 | B2 * | 10/2019 | Sarafin ................ F15B 13/0438 |
| 2015/0176720 | A1 | 6/2015 | De La Chevasnerie et al. |
| 2016/0033052 | A1 | 2/2016 | Bertrand |
| 2016/0146228 | A1 | 5/2016 | Ras et al. |

FOREIGN PATENT DOCUMENTS

EP          3217020 A1      9/2017

OTHER PUBLICATIONS

Extended European Search Report for International Application No. 17461610.2 dated Mar. 26, 2018, 6 pages.

* cited by examiner

*Primary Examiner* — Thomas W Irvin
(74) *Attorney, Agent, or Firm* — Cantor Colburn LLP

(57) ABSTRACT

A new method of forming a torsion spring for use in a servovalve is described. The method comprises individually forming the different components of the torsion spring and then connecting the individual components together using a brazing process. The torsion spring created by this method is also described.

10 Claims, 3 Drawing Sheets

METHOD FOR MANUFACTURING A TORSION SPRING FOR USE IN A SERVOVALVE AND THE TORSION SPRING ITSELF

FOREIGN PRIORITY

This application claims priority to European Patent Application No. 17461610.2 filed Sep. 22, 2017, the entire contents of which is incorporated herein by reference.

TECHNICAL FIELD

The examples described herein relate to methods of forming a torsion spring for use in a servovalve, particularly for nozzle-flapper type servovalves. The examples described herein also relate to the resulting torsion spring manufactured in this way and to the servovalves in which the torsion springs are used.

BACKGROUND

Servovalves are known in the art as being electrohydraulic/pneumatic systems which include a Torque Motor that functions as a driver for a second part—e.g. a hydraulic/fuel/pneumatic part.

In flapper-nozzle type servovalves, a flexible member (e.g. such as a torsion spring) is rigidly attached to a torque motor armature and a flapper extends away from the armature. Magnets and pole pieces are situated in the vicinity of the armature and upon application of an electrical signal to the torque motor, the armature pivots.

A torsion spring is also typically provided in a servo valve, for example an electrohydraulic servo valve incorporating a flapper nozzle. The torsion spring may be connected to the armature of the servovalve to bias the armature and the component connected thereto (e.g., the flapper) towards a rest position. The torsion spring may, therefore, be seen as a negative feedback mechanism to the movement of the magnetic armature.

SUMMARY

A method of manufacturing a torsion spring for a servovalve, comprising: providing wire; providing first and second ears each having a first, wire-receiving hollow channel extending therethrough; providing a seat suitable for receiving an armature of said servovalve, said seat having a first side hollow channel extending therethrough; inserting said wire through said wire-receiving hollow channels of the ears and the side hollow channel of the seat so that a first section of wire extends along a first axis Y at least from the first ear to the seat and a second section of wire extends at least from the seat to the second ear along said first axis Y; brazing the wire to the first and second ears and to the seat; and removing excess wire.

In some examples, the method uses only one wire to connect the components and the new method of manufacturing a torsion spring for a servovalve comprises providing a single wire, providing first and second ears, each having a first hollow wire-receiving channel extending therethrough; providing a seat suitable for receiving an armature of said servovalve, said seat having a first hollow wire-receiving seat channel extending therethrough; inserting the wire through said hollow channels of all three of the first and second ears and seat so that the wire extends along a first axis Y from the first ear to the seat and then to the second ear along said first axis, thereby forming the first and second sections of wire. The method further comprises the step of performing a brazing process to braze the wire to the first and second ears and to the seat; and then removing any excess wire, as necessary.

In some examples, the method uses two separate wires to connect the components and the new method of manufacturing a torsion spring for a servovalve comprises providing a first and a second wire, providing first and second ears, each having a first hollow wire-receiving channel extending therethrough; providing a seat suitable for receiving an armature of said servovalve, said seat having a first hollow wire-receiving seat channel extending therethrough; inserting the first wire through said wire receiving hollow channel of the first ear so that it extends along a first axis Y from the first ear to the seat to form the first section of wire and inserting the second wire into said wire-receiving channel of the seat, so that the second wire extends along said first axis Y from the seat to the second ear to form said second section of wire. The method further comprises the step of performing a brazing process to braze the first and second wires to the first and second ears and to the seat; and then removing any excess wire, as necessary.

In any of the examples described herein, these first and second sections of wire may provide the shafts that connect the ears to the seat.

In any of the examples described herein, the step of providing the ears may comprise manufacturing said ears and forming said first wire-receiving hollow channel through each of the ears via milling.

In any of the examples described herein, the step of providing the ears may further comprise manufacturing said ears and forming a second, bolt-receiving, hollow channel extending between opposite faces of, and through each of the ears, said second, bolt-receiving hollow channel extending along a second axis in a direction perpendicular to said axis. In use, this bolt-receiving channel extends vertically and along a direction that is perpendicular to the wire-receiving channels of both the ears as well as the seat.

In any of the examples described herein, the step of manufacturing the seat may further comprise forming a second seat hollow channel through the seat, said second hollow channel extending along an axis Z perpendicular to said first axis Y, said second hollow channel being suitable for receiving a flapper 12 of said servovalve. In use, the second seat hollow channel extends vertically and along an axis that is perpendicular to the wire receiving channels of the ears and seat.

In any of the examples described herein, said first side hollow channel may be formed in said seat so that it extends from a first side of the seat, through the seat, and to a second, opposite side of the seat.

In any of the examples described herein, the wire may be work-hardened and the method may further comprise work-hardening the wire before insertion into the channels of the ears and seat.

A torsion spring manufactured by any of the methods described herein is also described.

The torsion spring may be suitable for use in a servovalve and comprises first and second ears, with a seat being positioned between said first and second ears, said seat being suitable for receiving an armature of said servovalve; and with a first section of wire extending from the first ear to the seat and a second section of wire extending from the seat to the second ear, said sections of wire being brazed to said first ear, to said seat and to said second ear.

In some examples, the sections of wire connecting the components may be separate and distinct from each other. In some examples, a single piece of wire may have been used to connect all three components and to form the first and second sections of wire.

In any of the examples described herein, there may be a first braze joint between the wire and the first ear, a second braze joint between the wire and the seat and a third braze joint between the wire and the second ear.

In any of the examples described herein, the first and second ears may each have a wire-receiving hollow channel extending therethrough; and wire may be positioned within and extending from said wire-receiving hollow channels of said ears; and there may further comprise a braze joint between said wire and an internal surface of said wire-receiving hollow channels.

In any of the examples described herein, said seat may have a first side hollow channel extending therethrough; and said wire may be positioned within and extending from said side hollow channel of said seat; and there may further comprise a braze joint between said wire and an internal surface of said side hollow channel of the seat.

The wire therefore forms first and second shafts that extend outwardly from the seat and which connect the seat to the ears at either side of the seat. In the examples described herein, each of the wire, ears and seat are independently formed and then assembled together via the methods described herein.

DETAILED DESCRIPTION

The torsion spring (also sometimes referred to in the art as a torsion bridge) is used in a servovalve as a negative feedback mechanism to magnetic phenomenon and is often seen as one of the most important components in a servovalve (of the flapper-nozzle type). Without the torsion spring, the servovalve wouldn't be operational and the servovalve wouldn't work at all. Due to the tight tolerances and small movements in a servovalve, the stiffness of a torsion spring has to be determined and manufactured precisely, as the servovalve requires a high accuracy of component movement. The torsional stiffness of a torsion spring therefore has to be determined and manufactured very precisely; otherwise, the stroke and stroke gain of the servovalve may be insufficient.

Furthermore, another problem relating to the torsion spring is when it experiences a decrease in its length of service life (e.g. due to fatigue). A torsion spring will typically be subject to a high frequency of use cycles (e.g., 10 per minute), and so resistance to fatigue is an important factor when designing and/or manufacturing this component. Due to the torsion spring having to undergo a high number of cycles in its lifetime (e.g. 10 million cycles), it would be preferable if the torsion spring did not suffer from fatigue very readily. It can be said that fatigue is directly related to the torsion spring experiencing stresses (which should not exceed a determined limit). If a servovalve is obligated by particular requirements in a specification to show a large stroke, then rotation of the torsion spring is also large and it then experiences stresses above its maximum strength.

Figure 1:
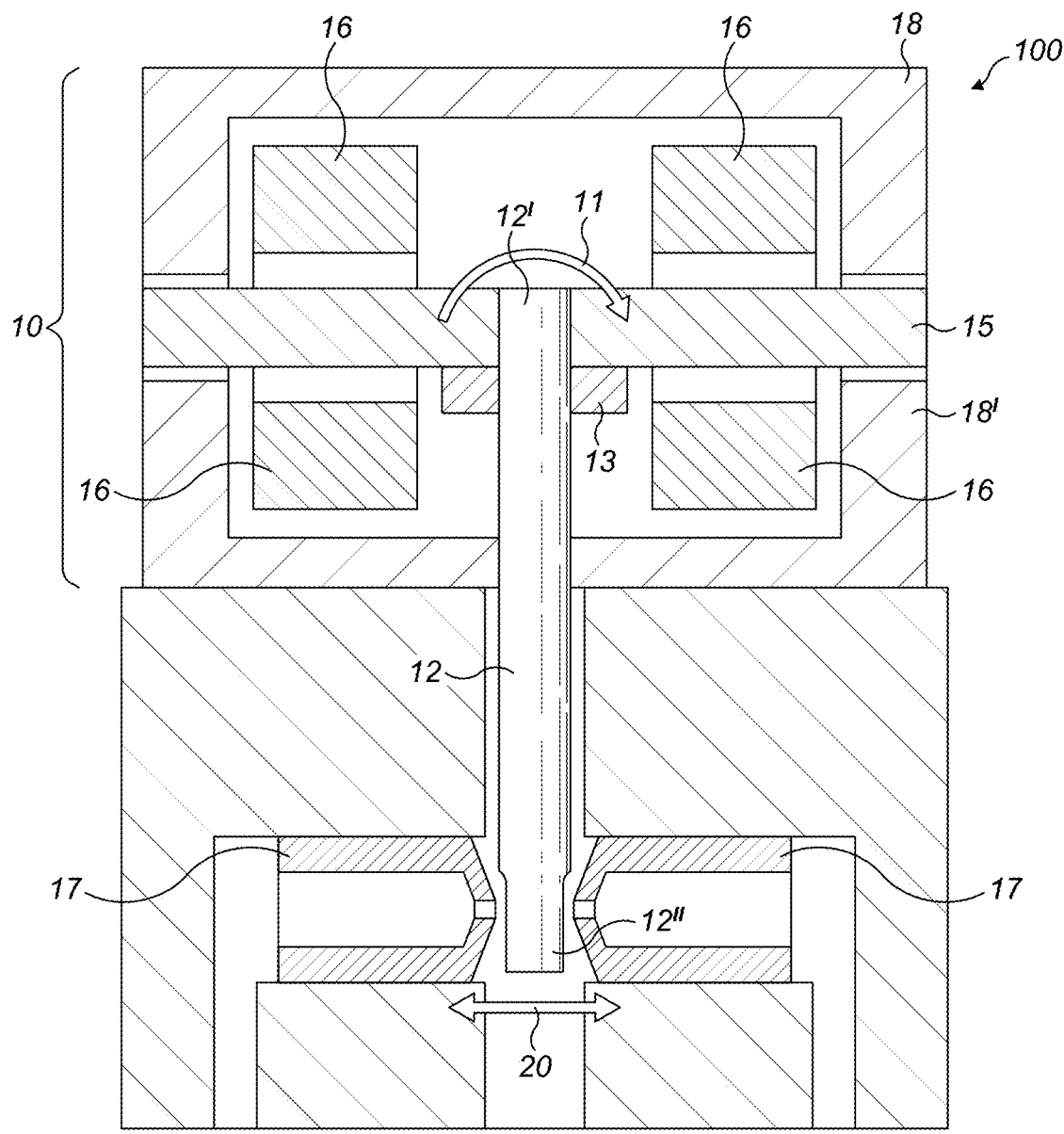
FIG. 1 depicts a known, flapper-nozzle type of servovalve.

FIG. 1 depicts a schematic side view of a known, standard servovalve 100, of the flapper-nozzle type. The torsion spring as described with reference to FIGS. 2 to 5 may be used in this type of known servovalve. The servovalve comprises a torque motor 10. The flapper nozzle comprises a flapper 12, having a first end 12' and a second end 12" with a torsion spring 13 and an armature 15 at its first end 12'. The armature 15 and flapper 12 and part of this torsion spring 13 rotate, as is shown with reference numeral 11 in FIG. 1. The armature is rigidly connected with the flapper 12 and the torsion spring 13. Two nozzles 17 are positioned at the second end 12" of the flapper 12 and the flapper 12 orients between these two nozzles 17 in use, as is known in the art. The stroke of the flapper 12 is depicted in FIG. 1 with the reference numeral 20. First 18 and second 18' pole pieces lie above and below the armature 15 respectively with magnets (not shown) and coils 16 are positioned between these pole pieces 18, 18'. The torsion spring 13 provides stiffness to the flapper/armature assembly. Such flapper-nozzle type servovalves are well known in the art.

In many servovalves (of the flapper-nozzle type), the torsion spring 13 is manufactured to comprise a seat for receiving the armature, with first and second symmetrical shafts extending in opposite directions away from the seat, and first and second ears provided at the other end of the shafts that are furthest away from the seat. In known servovalves, the torsion spring is manufactured as a whole from one piece of material.

Unfortunately, however, this design has at least the following three main disadvantages: 1) high cost of manufacturing (e.g. the shafts have to be turned/rotated in order to machine the shafts, which is difficult to do), 2) difficulty in obtaining the correct stiffness for each spring manufactured within a particular batch (due to the fact that the stiffness is very sensitive to the diameter of shafts), and 3) the design is further limited by the diameter of the shafts due to the fact that it is very difficult to rotate shafts with a small diameter during machining as they will be quite flexible due to their small diameter. Further, if the design demands low stiffness of the spring, it will also be difficult to manufacture because the diameter of the shafts will also have to be relatively small.

Figure 2:
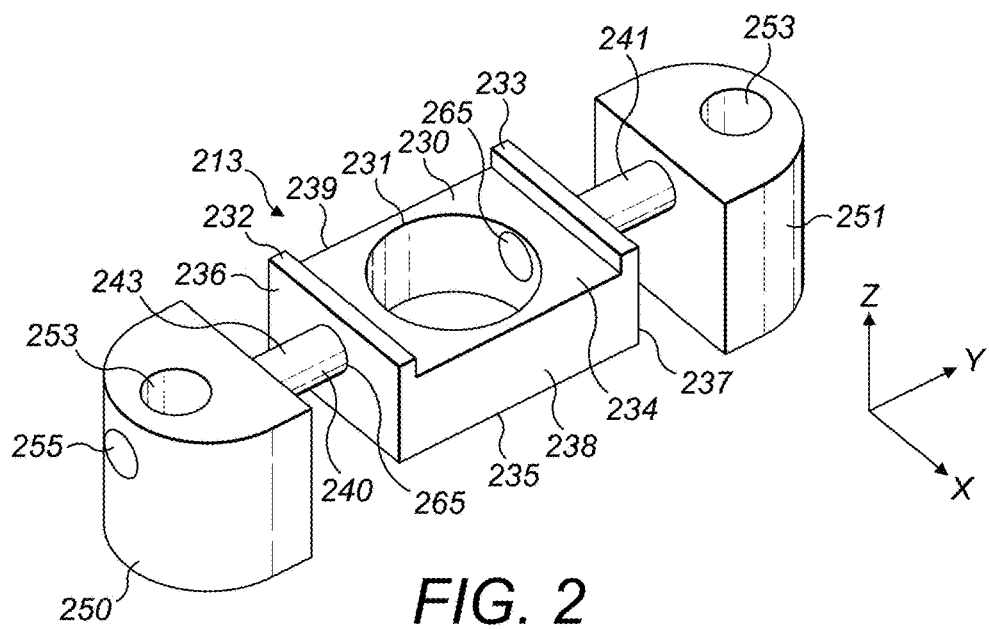
FIG. 2 depicts an example of a new type of torsion spring that may be used in a flapper-nozzle type of servovalve such as that shown in FIG. 1.

The new examples described herein with reference to FIGS. 2 to 5 therefore aim to overcome these disadvantages. This is achieved by manufacturing the torsion spring 213 from at least four separate pieces of material, instead of from only one piece of material, as is known in the art. The new type of torsion spring 213 is depicted in FIGS. 2 (with no armature 15 in place), 3 (with armature 15 in place) and 4 (during manufacture). These new types of torsion spring 213 can be used in any known servovalve of the flapper-nozzle type.

The torsion spring 213 comprises means, 230, (e.g. referred to herein as a seat) for receiving the armature 15, in use. The seat 230 may be any suitable shape or size for receiving an armature 15 thereon in use. In the examples shown in FIGS. 2 to 5, the seat 230 is a cube-shaped block; however, other shapes may also be used. The seat in these examples has first 236 and second 237 opposing sides and first and second opposing faces 234, 235, extending perpendicularly to, and between said first and second sides 236, 237 to create the cube, or block shape. The seat 230, of course, also has third and fourth sides 238, 239 extending between perpendicularly to, and between said first and second sides 236, 237, to create the cube shape. The seat 230 further comprises a seat hollow channel 231 that extends through and between the first and second faces 234, 235, (i.e. along the Z axis of a Cartesian coordinate system) of the seat. This seat hollow channel 231 extends vertically through the seat 230 and is provided to receive the vertically positioned flapper 12 therethrough, as is known in the art and as shown in FIGS. 2 and 3.

Figure 3:
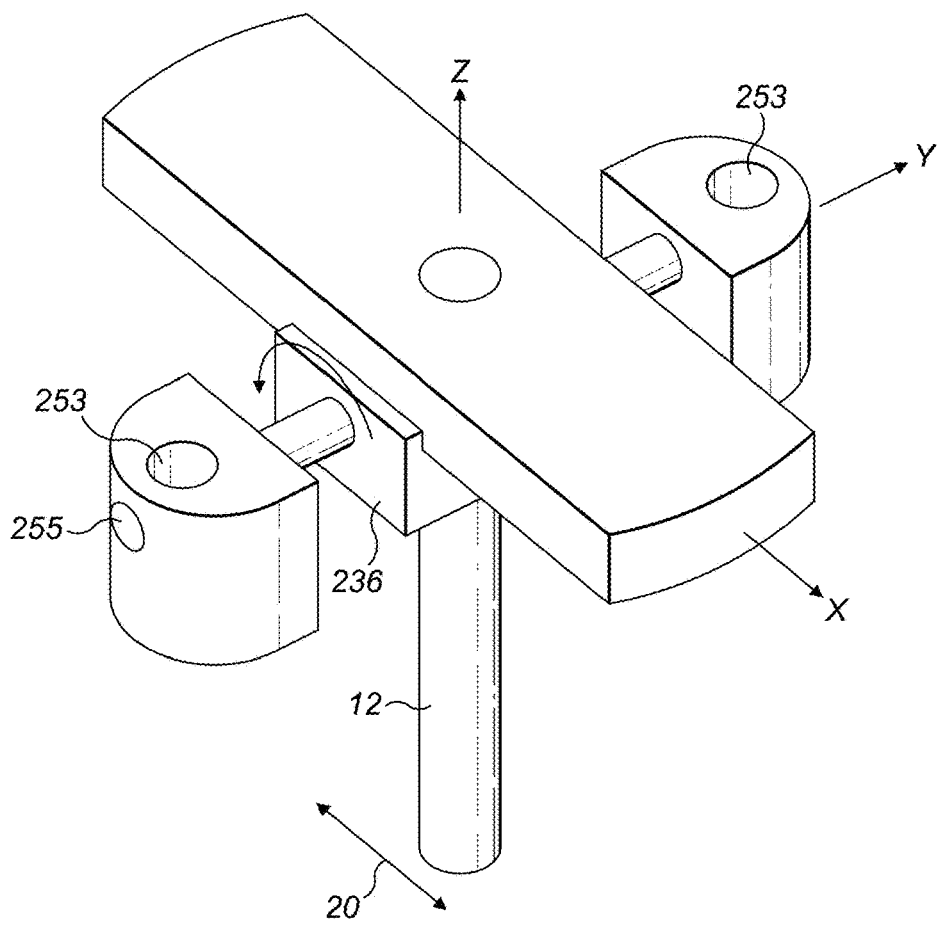
FIG. 3 depicts an example of a new type of torsion spring that may be used in a flapper-nozzle type of servovalve such as that shown in FIG. 1, further showing the armature

The surface of the first face 234 of the seat 230 (which is positioned facing upwards in use) is shaped and sized so as to receive the armature 15 in use so that the armature 15 lies longitudinally on the upper face 234 of the seat along the X axis, (X being perpendicular to the axis of the seat channel 231 in the seat 230, as is known in the Cartesian coordinate system) as shown in FIG. 3. In this regard, the seat 230 may further comprise further means 232, 233, for retaining the armature 15 in place on this first face 234. This means may comprise the first side 236 extending away from the upper face 234 both along the X and Z axes to form a first ridge 232 at the first side 236 of the upper face 234 of the seat. This means may also further comprise the second side 237 extending away from the upper face 234 both along the X and Z axes to form a second ridge 233 at the opposite, second side 237 of the upper face 234 of the seat. These ridges 232, 233 therefore contact and hold in place the longitudinal sides of the armature 15 when it is positioned in the seat 230 in use, as is show in FIG. 3.

The seat 230 may further comprise a side hollow channel 265 that extends from the first side 236 of the seat 230, through the seat 230, in the Y direction, and out through the opposite, second side 237 of the seat 230. This side hollow channel 265 is sized and shaped to be able to receive a wire 243. As described later with reference to the method 500, this wire 243 eventually forms the first and second shafts of the torsion spring 213 which extend away from the opposite, first and second sides 236, 237 of the seat 230 along the Y axis. These shafts 240, 241 therefore extend along an axis that is perpendicular to both the X and Z axes, as is known in the Cartesian coordinate system. This is shown in FIG. 2.

At the distal end of each of the first and second shafts 240, 241 (i.e. the end that is furthest away from the seat 230) the torsion spring 213 further comprises first and second ears 250, 251, respectively. Each of these ears 250, 251 also comprise a vertically extending bolt-receiving hollow channel 253 extending therethrough along the Z axis, as is shown in FIGS. 2 and 3, for receiving a bolt therethrough to fix the torsion spring 13 to a housing.

The first and second shafts 240, 241 are responsible for the mechanical stiffness of the torsion spring 213. As mentioned above, although the seat 230 is described and shown in these examples as being generally cube-shaped, other shapes could also be envisaged and the examples described herein should not be limited to only cube-shapes. In use, this seat 230 therefore indirectly connects the shafts 240, 241, with the armature 15, and the first and second ears 250, 251 connect the torsion spring 213 with a housing as is known in the art.

Figure 5:
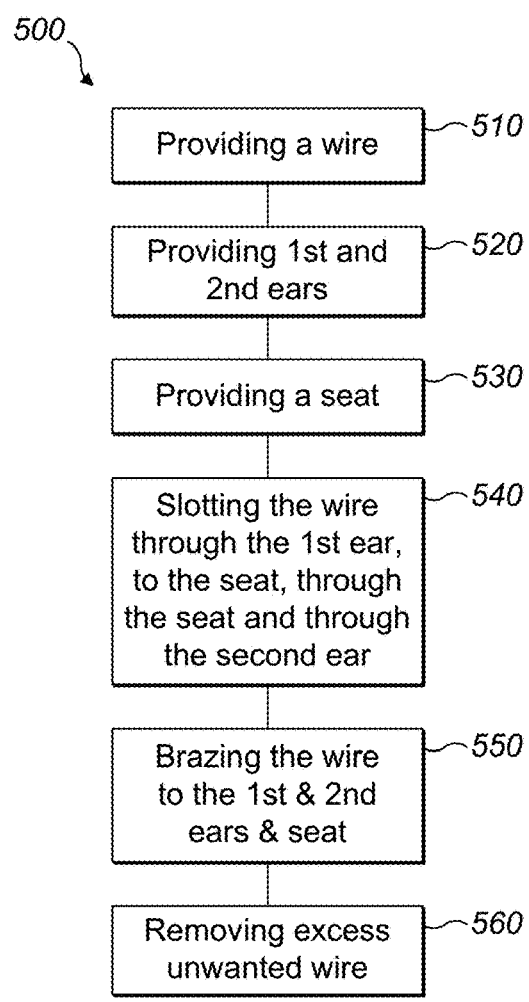
FIG. 5 depicts a method of manufacturing the new torsion spring as shown in FIGS. 2 to 4.

The method of manufacture 500 of a torsion spring 213 is depicted in the flow diagram of FIG. 5. In summary, the new method of forming a torsion spring comprises individually forming each of the different components of the torsion spring and then connecting the components together using a brazing process. The torsion spring created by this method is also described.

Figure 4:
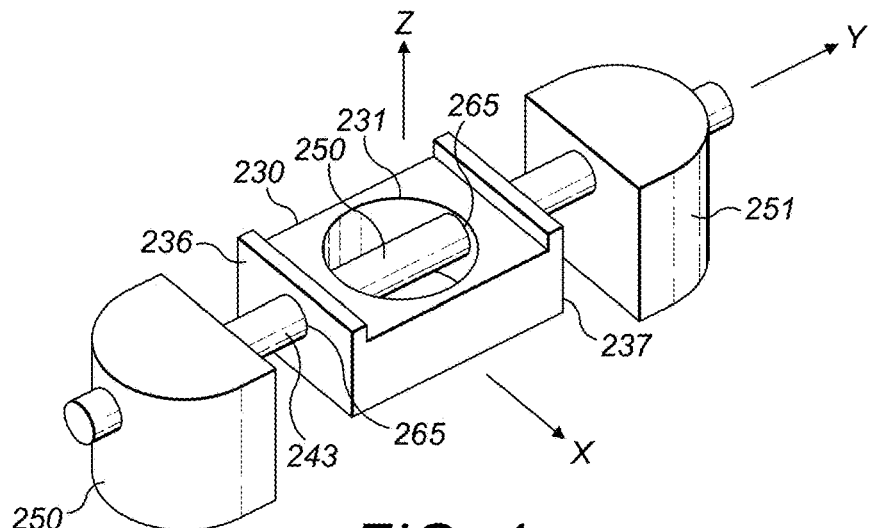
FIG. 4 depicts an example of a new type of torsion spring during manufacture.

In the new method 500 described herein with reference to FIGS. 2 to 4, the method may comprise the steps of: providing, or manufacturing 510 a wire 243, or wires. This wire, or these wires, will eventually form the shafts 240, 241 extending away from the seat 230. Although the examples shown in the FIGS. 2 to 4 and described herein are primarily described using only one wire 243, the method could also be performed using two separate wires. For example, a first section of wire could be used to form the shaft between the first ear 250 and the seat, and a second section of wire 251 (that is distinct and independent from the first section of wire could be used to form the shaft between the seat and the second ear 251, instead of using only one wire for connecting the seat to both ears.

The wire, or wires 243 may be manufactured from a material with high strength (e.g. steel is recommended, although other wires having similar high strength properties may be used). Examples of further materials may include Inconel, Titanium, Beryllium copper and other nonmagnetic materials. The method 500 further comprises the step of: providing or manufacturing 520, separately to said wire, first and second ears 250, 251 suitable for receiving a mounting bolt for mounting the torsion spring 213 to a housing. The method 500 may further comprise the step of providing or manufacturing 530, again, separately to the ears 250, 251 and wire, or wires 243, a seat 230 suitable for receiving the armature 15, as described above. The method steps 510 to 530 may be performed in any order.

The method 500 may then further comprise the step of inserting the wire 243 into and through a first hollow wire-receiving channel 255 formed in the first ear 250, and from there, into and through the side hollow channel 265 formed in the seat 230 and then from there, into and through a second hollow wire-receiving channel 255 formed in the second ear 251, as described above, and as shown in FIG. 4. Of course, rather than threading one single wire through and between each of these three components, in some examples, two separate and distinct sections of lengths, or pieces of wire may alternatively be used so that the first section of wire is inserted into and through the first hollow wire-receiving channel 255 formed in the first ear 250, and from there, into and through the side hollow channel 265 formed in the seat 230. This wire therefore forms the shaft that connects the first ear 250 to the seat. Then a second section of length of wire may be threaded from the side hollow wire-receiving channel 265 of the seat 230 (that is at the opposite side of the seat), into and through the hollow wire-receiving channel of the second ear 251. This therefore forms the second shaft that connects the seat 230 to the second ear 251.

Once the wire, or wires 243 is/are slotted through all three components, 250, 230, 251, the method may further comprise the step of performing a brazing process to braze the first ear 251 to the wire 243, brazing the seat 230 to the wire 243 and brazing the second ear 251 to the wire 243.

There may therefore be braze joints between the wire and each of the individual components of the ears and seats. There may also be braze joints between the wire and each of the internal surface of the channels of the ears and seat through which the wire is inserted.

Once the brazing process is complete, the method may further comprise the step of removing all needless and excess elements of the wire 243 by cutting it away (e.g. such as removing the section 250 of wire 243 that is extending across the channel 231 in the seat 230 along the Y axis as shown in FIG. 4). This method therefore results in the improved torsion spring 213 as shown in FIGS. 2 and 3 that may be used in any servovalve of this type.

The steps of manufacturing 520, 530 the seat 230 and/or ears 250, 251 may comprise milling. Materials that may be used to manufacture the seat and/or ears may include any material that is good for brazing and that is nonmagnetic.

As described above, the step of manufacturing 520 the ears may further comprise forming a vertical, bolt-receiving hollow channel 253 through each of the ears 250, 251 along the Z-axis for receiving a bolt to mount the ears 250, 251 to a housing. As also described above, the step of manufacturing 520 the ears may further comprise forming, e.g. via milling, or other means, first and second wire-receiving hollow channels 255 extending between opposite sides of, and through each of the ears 250, 251 the channel extending along the Y axis. This channel should therefore be sized and shaped to receive the wire, as described above.

In a similar way, the step of manufacturing 530 the seat 230 may further comprise forming the vertically orientated seat hollow channel 231 through the seat 230 along the Z-axis for receiving the flapper 12. The step of manufacturing 530 the seat 230 may also comprise forming the side hollow channel 265 that extends from a first side 236 of the seat 230, through the seat, and to a second, opposite side 237 of the seat, along the Y axis. This side hollow channel 265 should also be sized and shaped to receive the wire 243.

Manufacturing the torsion spring 213 in this way results in advantages over prior art manufacturing techniques and torsion springs. For example, it is much easier to guarantee the resulting stiffness of the torsion spring because the dimensional accuracy of the pre-formed wire 243 is higher than the accuracy of a shaft in a known torsion spring wherein problems arrive during the rotational machining of the shaft, especially if a small stiffness (diameter) is needed.

The fatigue properties of the torsion spring are also improved because the wire may be manufactured using a cold working process. Such cold working processes increase fatigue properties and increase the yield strength due to internal work-hardening.

In addition to this, the wires that may be used in the examples described herein may often be drawn and so the surface roughness of these wires after such cold working is better than in shafts that have been machined whilst being turned. The properties of the wires in the examples described herein are therefore better and more uniform and the fatigue strength of such wires is also much higher.

Also, in the examples described herein, the wire is brazed to the rest of the parts via its outer circumference. The load is therefore transferred from the wire to the other components to which it is brazed via pure torsion which results in shear stresses in brazing. The strength of brazing is superior in shear stress.

Another advantage is that no notches are formed during the manufacturing process. In known methods, notches may form during manufacture and these increase stresses between the shafts and the other components.

It is more feasible and simpler to manufacture the torsion spring with a small stiffness (and diameter). This is in contrast to known methods, wherein, during turning, there may be a problem due to destruction of an element when a small diameter is manufactured.

The invention claimed is:

1. A method of manufacturing a torsion spring for a servovalve, comprising:
providing wire;
providing first and second ears, each having a first, wire-receiving hollow channel extending therethrough;
providing a seat suitable for receiving an armature of said servovalve, said seat having a first side hollow channel extending therethrough;
inserting said wire through said wire-receiving hollow channels of the ears and the side hollow channel of the seat so that a first section of wire extends along a first axis (Y) at least from the first ear to the seat and a second section of wire extends at least from the seat to the second ear along said first axis (Y);
brazing the wire to the first and second ears and to the seat; and
removing excess wire.

2. The method of claim 1, wherein said step of providing wire comprises:
providing one wire; and
wherein said step of inserting said wire comprises inserting the wire through said hollow channels of all three of the first and second ears and seat so that the wire extends along said first axis Y from the first ear to the seat and then from the seat to the second ear along said first axis.

3. The method of claim 1, wherein said step of providing wire comprises:
providing first and second wires; and
wherein said step of inserting said wires comprises inserting the first wire through said wire receiving hollow channel of the first ear to form said first section of wire that extends along a first axis Y from the first ear to the seat and inserting the second wire into said wire-receiving channel of the seat to form said second section of wire that extends along said first axis Y from the seat to the second ear.

4. The method of claim 1, wherein the step of providing the ears comprises:
manufacturing said ears and forming said first wire-receiving hollow channel through each of the ears via milling.

5. The method of claim 1, wherein the step of providing the ears further comprises:
manufacturing said ears and forming a second bolt-receiving hollow channel extending between opposite faces of, and through each of the ears, said second bolt-receiving hollow channel extending along a second axis (X) in a direction perpendicular to said first axis (Y).

6. The method of claim 1, wherein the step of manufacturing the seat further comprises:
forming a second seat hollow channel through the seat, said second seat hollow channel extending along an axis (Z) perpendicular to said first axis (Y), said second seat hollow channel being suitable for receiving a flapper of said servovalve.

7. The method of claim 1, wherein said first side hollow channel is formed in said seat so that it extends from a first side of the seat, through the seat, and to a second, opposite side of the seat.

8. The method of claim 1, wherein said method further comprises work-hardening the wire before insertion into the channels of the ears and seat.

9. A torsion spring for use in a servovalve, comprising:
first and second ears;
a seat positioned between said first and second ears, said seat being suitable for receiving an armature of said servovalve;
a first section of wire extending from the first ear to the seat and a second section of wire extending from the seat to the second ear, and said first and second sections of wire being brazed to said first ear, to said seat and to said second ear;

wherein said first and second ears each have a wire-receiving hollow channel extending therethrough and said first and second sections of wire are positioned within and extending from said wire-receiving hollow channels of said ears;

the spring further comprising:

a braze joint between said sections of wire and an internal surface of said wire-receiving hollow channels.

10. The torsion spring of claim 9, wherein said seat has a first side hollow channel extending therethrough and said wire being positioned within and extending from said side hollow channel of said seat;

the spring further comprising:

a braze joint between said sections of wire and an internal surface of said side hollow channel of the seat.

\* \* \* \* \*